United States Patent

[11] 3,567,052

| | | |
|---|---|---|
| [72] | Inventors | Millard Allen<br>Phoenix, Ariz.;<br>Clara Allen, Executrix |
| [21] | Appl. No. | 859,120 |
| [22] | Filed | Sept. 18, 1969 |
| [45] | Patented | Mar. 2, 1971 |

[54] MOTORCYCLE CARRIER
3 Claims, 6 Drawing Figs.

[52] U.S. Cl. .................................................... 214/450, 224/42.08
[51] Int. Cl. ........................................................... B60r 9/00
[50] Field of Search ......................................... 224/42.03, 42.04, 42.05, 42.06, 42.07, 42.08; 214/450, 451, 452, 453, 454

[56] References Cited
UNITED STATES PATENTS
3,458,073  7/1969  R. F. Dawson ............... 214/450

Primary Examiner—Albert J. Makay
Assistant Examiner—John Mannix
Attorney—James H. Phillips ABSTRACT: A motorcycle rack is attached to the step bumper of a road vehicle by pivot means and cantilevered lift means. A jack raises and lowers one end of the rack between a loading position on the ground and a carrying position in side-by-side relationship to the step bumper.

INVENTOR.
MILLARD ALLEN

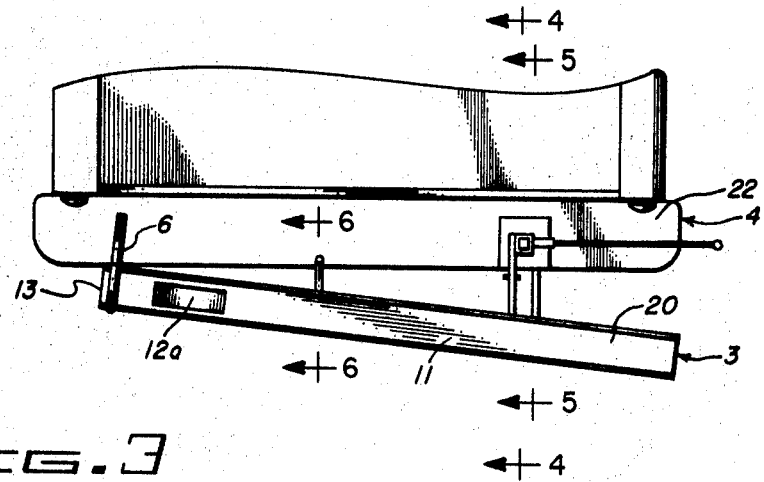
FIG. 3
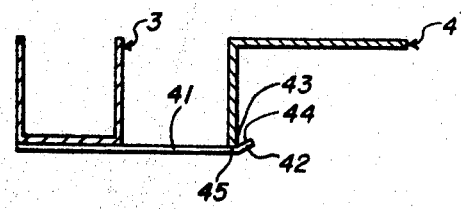
FIG. 4
FIG. 5
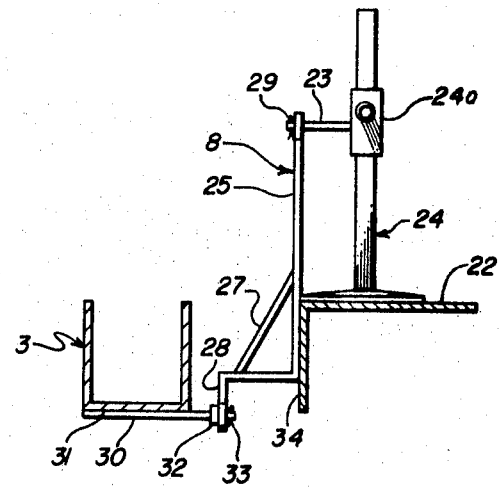
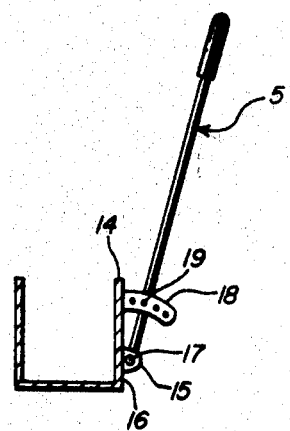
FIG. 6
INVENTOR.
MILLARD ALLEN
BY
Drummond, Cahill & Phillips
ATTORNEYS

MOTORCYCLE CARRIER

My invention relates to an improved rack for carrying a motorcycle on a road vehicle, such as a camper truck.

It is known to provide carrying racks for motorcycles on the rear of road vehicles. For example, see Meredith, U.S. Pat. No. 3,366,256 and Will, U.S. Pat. No. 3,348,713. It is, however, desirable to have the benefit of a loading mechanism which is stable and completely under the control of the operator at every stage of the loading procedure. A disadvantage of the prior art is that if the operator loses his grip on the loading apparatus at certain points in the process of loading and securing the cycle, the potential energy of the carrier apparatus and the cycle may result in uncontrolled force, leading to awkward results.

Consequently it is an object of this invention to provide an improvement to known devices for securing motorcycles to road vehicles of the four-wheel type.

It is also an object to provide such a device which is convenient to use and which requires only minimal effort on the part of the user.

It is yet another object of this invention to build such a device which is safe and easy to keep under control.

Other, further, and more specific objects and advantages of the invention disclosed will become apparent to those skilled in the art from the following description of the invention taken in conjunction with the drawings in which:

FIG. 3 shows the horizontal relationship between my invention and a step bumper to which it is attached, as viewed from above;

FIG. 4 is a view along lines 4-4 of FIG. 3, showing the cantilever attachment of the base member to the lift apparatus of the jack;

FIG. 5 is a view along lines 5-5 of FIG. 3, illustrating the relationship of the base member stop means and step bumper;

FIG. 6 is a view long lines 6-6 of FIG. 3.

Briefly, I provide a motorcycle rack for carrying a motorcycle on the step bumper of the road vehicle. A step bumper has a horizontal surface and a vertical surface which has a bottom edge. In cross section, the bumper is L-shaped with the leg of the L pointed down. The rack has an elongate base member whose cross-sectional configuration is substantially U-shaped. The base member is adapted to receive motorcycle wheels and has a pivot end and a loading end. The base member also has an aperture in the web of the U adjacent to the pivot end. This aperture is shaped and dimensioned to receive a portion of a wheel of the motorcycle.

The rack has means for pivotally attaching the pivot end of the base member to the step bumper at an acute angle thereto. The axis of the pivot is horizontal to permit arcuate movement of the loading end between the ground-contacting loading position and the horizontal carrying position. The motorcycle rack also has an inclined standard for supporting the motorcycle, said standard extending upwardly from the base member toward the road vehicle. Another element of the rack is a lift means for raising and lowering the loading end from its loading position to the horizontal carrying position. The lift means includes a jack mounted on the step bumper and having a lift mechanism. It also has a cantilevered support means which pivotally connects the loading end of the base member to the lift mechanism of the jack. The support means is vertically supported by the jack and is horizontally supported and guided by the step bumper in vertical sliding relationship thereto. Another element of the rack is a stop means having a finger extending horizontally from the base member toward the bottom edge of the step bumper. This finger has an upturned end which is adapted to engage the bottom edge of the step bumper in wedging relationship.

Figure 1:
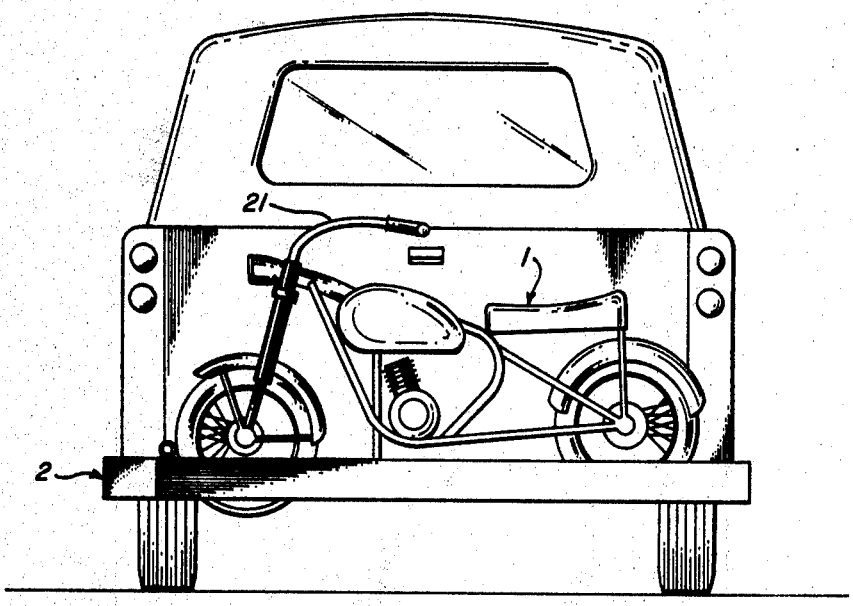
FIG. 1 is a rear elevation of a truck having step bumper on which is mounted a motorcycle rack constructed in accordance with my invention and a motorcycle mounted in carrying position.

Turning now to the drawings in which the same reference numerals indicate corresponding elements throughout the several views, FIG. 1 shows the motorcycle 1 in carrying position in the rack 2 as the motorcycle and rack appear when mounted to the step bumper of a typical road vehicle; in this case a truck.

Figure 2:
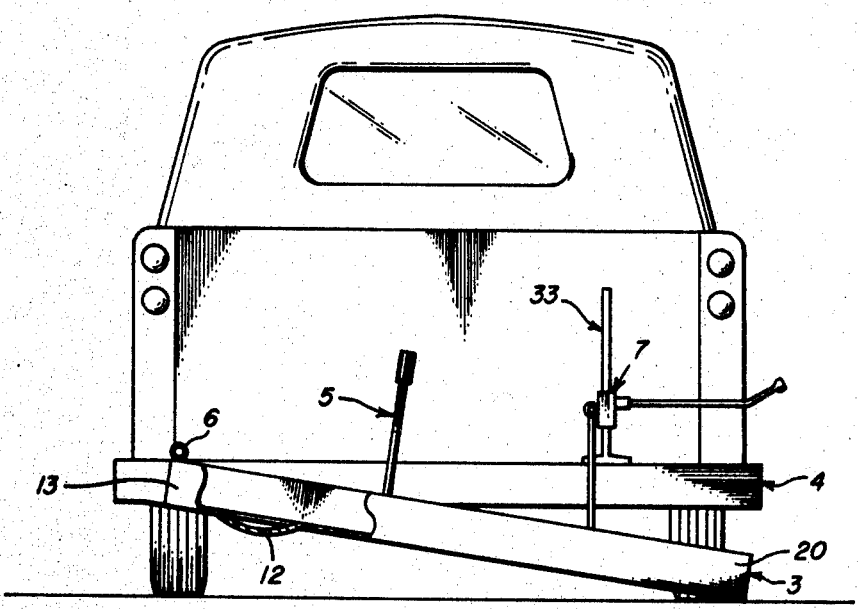
FIG. 2 is a view similar to that of FIG. 1 without the motorcycle, showing my invention in ground-contacting loading position.

In FIG. 2, the motorcycle has been removed and the base member 3 has been lowered to the loading position. The base member 3 is attached to the step bumper 4 at its pivot end 13 by means of a hinge 6. The base member 3 is a channel-shaped member which extends along the step bumper 4 at an acute angle thereto. The web 11 of the base member 3 has a portion 12a removed from the web 11 near the pivot end 13. This aperture 12a is rectangular in appearance. The width is wide enough to accommodate standard motorcycle tires of varying width and its length defines a cord of the circle formed by the perimeter of a motorcycle tire, the cord being less than the diameter thereof. In the embodiment shown in FIG. 2, the wheel of the motorcycle is supported by an arcuately shaped support piece 12 which arcs below the aperture. The support piece 12 depends from the portion of the web 11 defining the aperture 12a and is longitudinally disposed to the length of the support member 3.

The pivot end 5 is supported by a hinge attached to the step bumper 4. The pivot axis of the hinge 6 is horizontal and disposed slightly at an angle to the length of the step bumper 4 to permit the base member 3 to form an acute angle with the step bumper 4. This angular relationship is preferred to allow space between the motorcycle 1 and the vehicle to accommodate the handle bars 21 of the motorcycle 1. The horizontal disposition of the pivot axis of the hinge 6 permits vertically arcuate motion of the loading end 20.

When the base member 3 is in ground-contacting position, a motorcycle can be wheeled on to the base member far enough to engage the front wheel of the motorcycle in the aperture 12a of the web 11. The motorcycle 1 rests against the support bar 5 and can be tied to it if necessary by any convenient means such as a leather strap or a rope. The support bar 5 is adjustable to accommodate the width of the motorcycle 1 and permit it to incline toward the road vehicle.

The motorcycle 1 is elevated to carrying position by the lift means 8 shown in FIG. 4. The lift means in this preferred embodiment is made of a bumper jack 24, the base of which is welded or otherwise conveniently attached to the top face 22 of the step bumper 4. Attached to the lift mechanism 24a of the bumper jack 24 is a horizontal lift rod 23 extending toward the base member 3, a vertical strap 25 having an aperture near its upper end engaging the lift rod 23 and secured thereto by means of a cotter pin 29 disposed at the end of the lift rod 23. This arrangement permits the strap 25 to pivot about the lift rod 23 as the base member 3 is raised and lowered. The vertical strap 25 is joined to a horizontal strap 26 which is braced against the vertical strap 25 by an angular strap 27. The horizontal strap 26 has a downwardly depending flange 28 which is provided with an aperture near its bottom end which engages and supports an arm 30 extending from the underside 31 of the base member 3. A tab 32 is welded on the arm 30 between the vertical flange 28 and the base member 3 to act as a stop means for maintaining the desired distance between the vertical flange 28 and the base member 3. The relationship between vertical flange 28 and the arm 30 permits the flange 28 to pivot around the arm 30. This, in cooperation with the pivot arrangement between the vertical strap 25 and the lift rod 23 allows the freedom of movement in the various connected parts required by the raising and lowering of the base member between the loading and carrying positions. A cotter pin 33 secures the arm 30 in its connection to the flange 28. The vertical strap 25 is laterally supported by the side face 34 of the step bumper 4 in vertical sliding relationship thereto.

FIG. 5 illustrates a stop means which delimits the carrying position of the base member 3. As seen in FIG. 5, the base member 3 has a finger 41 welded or bolted to the underside of the base member 3 and extending laterally to the step bumper 4. A finger 41 has an upturned end 42. The raising and lowering action of the base member is such that as the finger 41 approaches the bottom edge 43 of the step bumper 4, the upper face 44 of the upturned end 42 of the finger 41 first engages the lower edge 43 of the step bumper 4 on the upper face 44 of the upturned end 42. As the base member 4 is cranked upward, the bottom edge 43 of the step bumper 4 is forced along the upper face 44 of the upturned end 42 until it reaches the upper face 45 of the finger 41 at a point adjacent the corner formed by the upper face 45 of the finger 41 and the upper face 44 of the upturned end 42. This wedging action stabilizes the base member 3 in relationship to the step bumper 4 and prevents play between these two parts. An added benefit is the reduction of rattling.

I claim:

1. A motorcycle rack for carrying a motorcycle on a step bumper of a road vehicle, said step bumper having a horizontal surface and a vertical surface having a bottom edge, the rack comprising:
  a. an elongate base member of substantially U-shaped cross-sectional configuration adapted to receive a motorcycle, said base member having:
    a pivot end and a loading end; and
    an aperture in the web of the U adjacent the pivot end shaped and dimensioned to receive a portion of a wheel of a motorcycle;
  b. means for pivotally attaching the pivot end of said base member to the step bumper at an acute angle thereto, the axis of the pivot being horizontal to permit the arcuate movement of the loading end between a ground-contacting loading position and a horizontal carrying position;
  c. an inclined standard for supporting the motorcycle, said standard extending upwardly from said base member toward the road vehicle;
  d. lift means for raising and lowering the loading end from the loading position to the horizontal carrying position including:
    a jack mounted on the step bumper and having a lift mechanism;
    a moveable cantilevered support means adapted to pivotally connect the loading end of the base member to the lift mechanism of the jack, said support means being vertically supported by the jack and horizontally supported and guided by the step bumper in vertical sliding relationship thereto;
  e. stop means having a finger extending horizontally from the base member toward the bottom edge of the step bumper, said finger having an upturned end adapted to engage the bottom edge of the step bumper in wedging relationship.

2. The apparatus of claim 1 wherein the jack is a bumper jack.

3. The apparatus of claim 1 wherein the aperture in the web has an arcuately shaped elongate strap for supporting a wheel of the motorcycle, said strap depending from the edges of the aperture and being disposed below the aperture longitudinal to the base member, said strap connected at its two ends to the web.